US009227276B2

(12) United States Patent
Schacht et al.

(10) Patent No.: US 9,227,276 B2
(45) Date of Patent: Jan. 5, 2016

(54) HIGH TEMPERATURE BRAZING FIXTURE AND METHOD OF MANUFACTURE

(71) Applicant: SOLAR TURBINES INCORPORATED, San Diego, CA (US)

(72) Inventors: Thomas C. Schacht, Encinitas, CA (US); John Michael Irwin, Riverside, CA (US)

(73) Assignee: Solar Turbines Incorporated, San Diego, CA (US)

( * ) Notice: Subject to any disclaimer, the term of this patent is extended or adjusted under 35 U.S.C. 154(b) by 0 days.

(21) Appl. No.: 14/533,523

(22) Filed: Nov. 5, 2014

(65) Prior Publication Data
US 2015/0053750 A1 Feb. 26, 2015

Related U.S. Application Data

(62) Division of application No. 13/433,700, filed on Mar. 29, 2012, now Pat. No. 8,910,849.

(51) Int. Cl.
*B23K 37/00* (2006.01)
*B23K 37/02* (2006.01)
*B23Q 3/00* (2006.01)
*B23Q 3/18* (2006.01)
*B23K 37/04* (2006.01)
*B23K 1/00* (2006.01)
*B23K 1/008* (2006.01)
*B23K 3/08* (2006.01)
*F01D 25/28* (2006.01)

(52) U.S. Cl.
CPC .................. *B23K 37/04* (2013.01); *B23K 1/008* (2013.01); *B23K 1/0018* (2013.01); *B23K 3/087* (2013.01); *B23K 37/0426* (2013.01); *F01D 25/285* (2013.01); *B23K 2201/001* (2013.01); *F05D 2230/237* (2013.01); *Y10T 29/49826* (2015.01)

(58) Field of Classification Search
CPC ............. B23K 37/0533; B23K 9/0286; B23K 2201/06; B23K 37/0435; B23K 1/0012; B23K 2201/001; B23K 2201/10; B23K 3/087; B23K 2203/14; B23K 35/0244; B23K 35/286; B23K 35/3605; B23K 37/0229; B23K 37/02
USPC ......... 228/44.3; 269/287, 296, 297, 298, 299, 269/300, 301, 302, 303
See application file for complete search history.

(56) References Cited

U.S. PATENT DOCUMENTS 3,995,805 A 12/1976 Gersbacher
4,042,162 A 8/1977 Meginnis et al.
(Continued)

FOREIGN PATENT DOCUMENTS

JP 09257025 A * 9/1997

OTHER PUBLICATIONS

JP 09257025 A computer english translation.*

Primary Examiner — Erin Saad
(74) Attorney, Agent, or Firm — Procopio, Cory, Hargreaves & Savitch LLP

(57) ABSTRACT

A high temperature brazing fixture and method of manufacture for a gas turbine component made of a superalloy is disclosed herein. The high temperature brazing fixture includes a first and second frame member, a support member, and positioning member, all of which are made from the superalloy and fastened together using tab and tab lock couplings. The support member is configured to interface with and support the gas turbine engine component, and the positioning member is configured to interface with and position at least a first location of or hold a first dimension of the gas turbine component.

20 Claims, 8 Drawing Sheets

(56) References Cited

U.S. PATENT DOCUMENTS

| | | | |
|---|---|---|---|
| 4,089,456 A | 5/1978 | Toppen et al. | |
| 4,128,235 A | 12/1978 | Gersbacher | |
| 4,688,652 A | 8/1987 | Crist | |
| 6,129,257 A | 10/2000 | Xu et al. | |
| 2005/0109816 A1 * | 5/2005 | Swartzbeck et al. | 228/44.3 |

* cited by examiner

HIGH TEMPERATURE BRAZING FIXTURE AND METHOD OF MANUFACTURE

CROSS REFERENCE TO RELATED APPLICATIONS

This application is a divisional application of U.S. patent application Ser. No. 13/433,700, filed on Mar. 29, 2012, which is incorporated herein by reference in its entirety.

TECHNICAL FIELD

The present disclosure generally pertains to brazing, and is more particularly directed toward a high temperature brazing fixture.

BACKGROUND

Brazing is a metal-joining process whereby a filler metal is heated above its melting point and distributed between two or more close-fitting parts by capillary action. In particular, the filler metal is brought slightly above its melting (liquidus) temperature while protected by a suitable atmosphere, usually a flux. It then flows over the base metal (known as wetting) and is then cooled to join the workpieces together by creating a metallurgical bond between them at the atomic level. It is similar to soldering, except the temperatures used to melt the filler metal are above 450° C. (842° F.), or, as traditionally defined in the United States, above 800° F. (427° C.).

Existing brazing fixtures support the components to be brazed, and are made using conventional methods. In particular, frames and workpiece supports/positioning members are machined, formed, and/or welded together such that a component may be placed into the fixture, brazed, and removed from the fixture. In addition, although parts may be oriented correctly when first placed in the fixture that is to support them during brazing, differences in thermal expansion rates between the parts and the fixture surface tend to distort and shift the parts with respect to each other, which can be unacceptable with precision parts. Accordingly, in order to perform at, and even withstand, the elevated temperatures required, Xu et al., in U.S. Pat. No. 6,129,257 describe a high temperature brazing fixture made of the same high temperature alloy as the workpiece to be brazed, such that the fixture exhibits the same coefficient of thermal expansion as the workpiece. Over time and repeated brazing operations, the fixture may come out of alignment and/or need to be reworked or replaced.

The present disclosure is directed toward overcoming one or more of the problems discussed above as well as additional problems discovered by the inventor.

SUMMARY OF THE DISCLOSURE

A high temperature brazing fixture and method of manufacture for a gas turbine component made of a superalloy is disclosed herein. The high temperature brazing fixture includes a first and second frame member, a support member, and positioning member, all of which are made from the superalloy and fastened together using tab and tab lock couplings. The support member is configured to interface with and support the gas turbine engine component, and the positioning member is configured to interface with and position at least a first location of or hold a first dimension of the gas turbine component.

DETAILED DESCRIPTION

Figure 1:
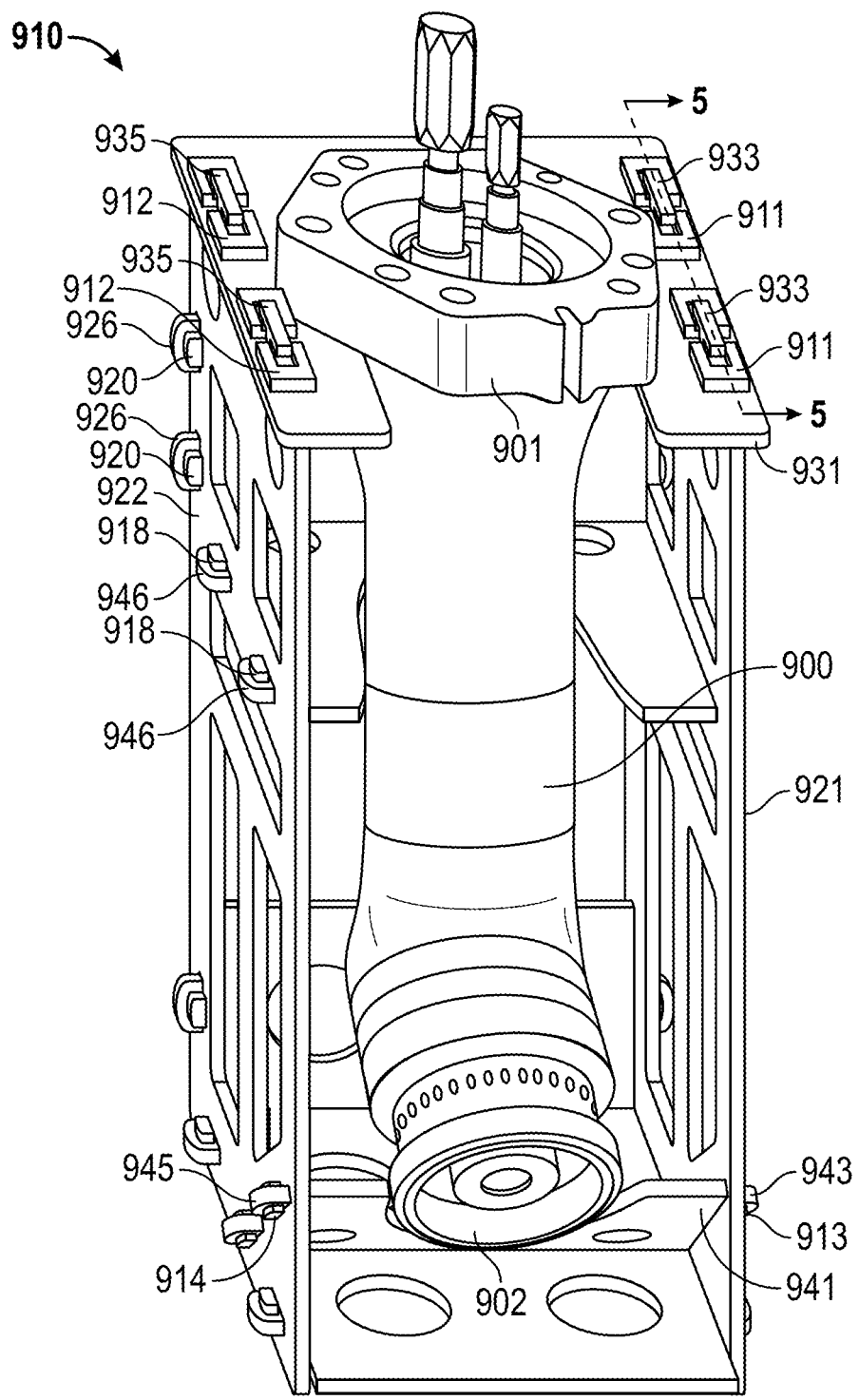
FIG. 1 is an isometric view of a high temperature brazing fixture with a gas turbine component installed.

FIG. 1 is an isometric view of a high temperature brazing fixture with a gas turbine component, according to an exemplary disclosed embodiment. In particular, a gas turbine fuel injector 900 is shown supported and positioned by high temperature brazing fixture 910. Here, gas turbine fuel injector 900 is shown supported by its mounting bracket 901 and its injector tip 902. Also, gas turbine fuel injector 900 shown include two critical axes (related to its installed position) to be positioned or aligned at predetermined locations (i.e., locations referenced off mounting bracket 901 as a base). Each gas turbine component to be brazed may have its own unique critical requirements.

As will be evident throughout the disclosure, the high temperature brazing fixture 910 may be readily reconfigured for different models of the gas turbine fuel injector 900 or the gas turbine fuel injectors generally. Likewise, the high temperature brazing fixture 910 may be readily repaired by replacing one or more of its modular members. Furthermore, the high temperature brazing fixture 910 disclosed herein merely illustrates representative features and interactions between its modular members for one particular component, but it should be recognized that other components and other configurations of the representative features are contemplated.

As illustrated, high temperature brazing fixture 910 may include a first frame member 921 and a second frame member 922, both made from the same material as the gas turbine fuel injector 900. Modern gas turbine components may be made from stainless steel and/or durable, high temperature materials known as "superalloys". A superalloy, or high-performance alloy, is an alloy that exhibits excellent mechanical strength and creep resistance at high temperatures, good surface stability, and corrosion and oxidation resistance. Superalloys may include materials such as Hastelloy, Inconel, Waspaloy, Rene alloys, Haynes alloys, Incoloy, MP98T, TMS alloys, and CMSX single crystal alloys. Despite high cost and traditionally high fixture turnover, here, high temperature brazing fixture 910 may be still made from the same superalloy as gas turbine fuel injector 900, or a material having a coefficient of thermal expansion sufficiently similar to that of the gas turbine component so as to not cause the component or its parts to be moved out of tolerance during brazing operations.

While no particular geometry or shape must be used, here, both frame members 921, 922 are generally shown as having a rectangular shape, and of sufficient height and thickness to support the gas turbine fuel injector 900 during the brazing process. For example, here, all members may be fabricated from a material such as ¼ inch RA330 plate. However, it is understood that the material thickness and/or material of these and other high temperature braze fixture members could depend on several variables related to the particular brazing process being performed (e.g., temperature, braze time, component weight, material creep properties, component post-brazing design tolerances, and number of brazing operations desired from the brazing fixture).

Also, while different members may offer overlapping usage, here frame members 921, 922 may form the "base" (i.e., furnace floor interface) of the high temperature brazing fixture 910, and are configured such that high temperature brazing fixture 910 may stand alone without external supports. In alternate embodiments, an additional frame member and/or a component interfacing member might be used as a fixture base.

Figure 2:
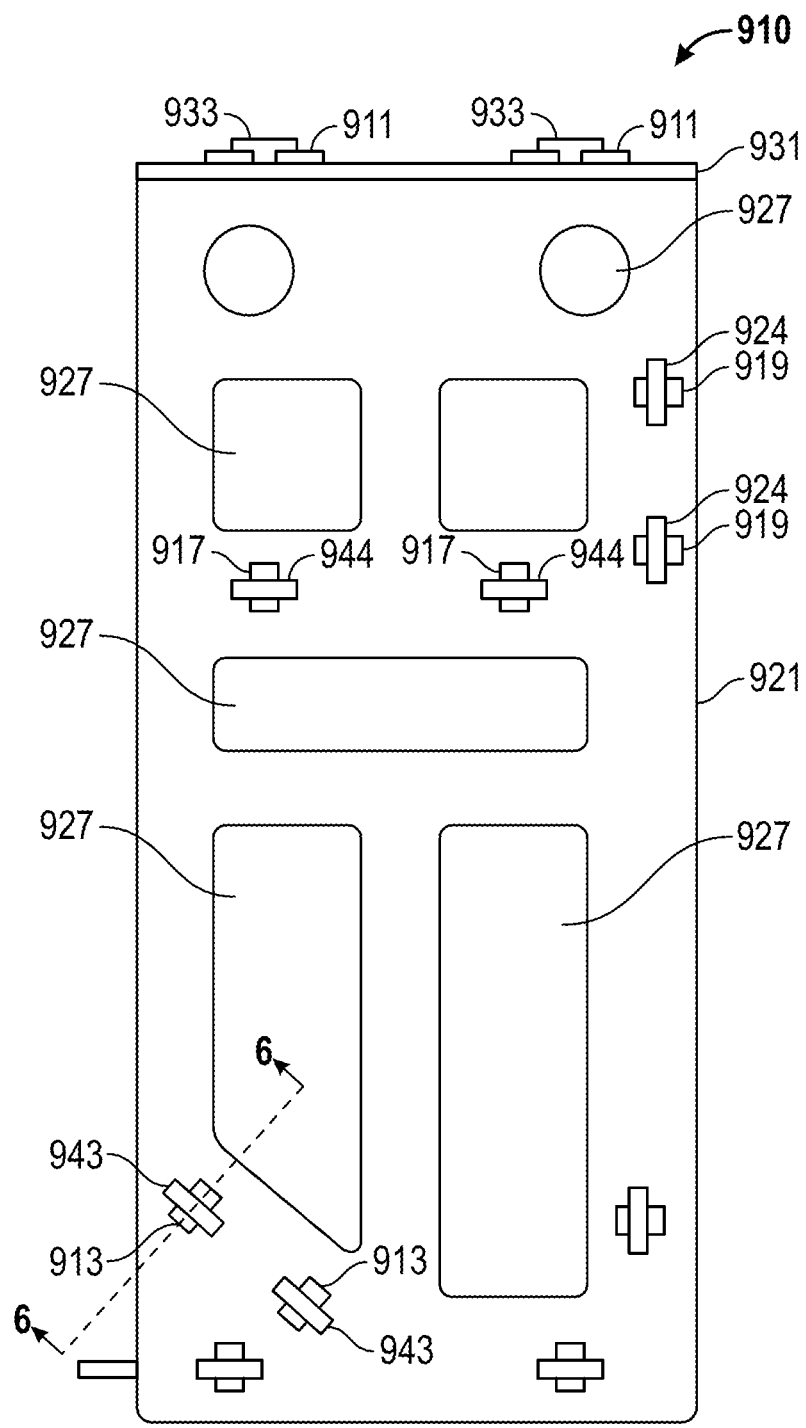
FIG. 2 is a side view of a high temperature brazing fixture without a gas turbine component.

FIG. 2 is a side view of high temperature brazing fixture 910 without the gas turbine component. According to one embodiment, first frame member 921 and a second frame member 922, may include one or more flow holes 927. Each flow hole 927 may have any shape or size, as shown. Each flow hole 927 may be formed so as to provide for an even heat flow/distribution and reduce heat sink effects during brazing operations. In addition, each flow hole 927 may be formed so as to reduce overall costs (e.g., due to superalloy content) of high temperature brazing fixture 910. Other members described herein may or may not include their own flow holes such as the flow holes 927 of first frame member 921 and a second frame member 922. Accordingly, frame members, support members, and positioning members, whether separate or combined, may include one or more flow holes 927.

Returning to FIG. 1, high temperature brazing fixture 910 may also include a support member 931 and positioning member 941, both made from the superalloy. Again, while no particular geometry or shape must be used, support and positioning members 931, 941 may be generally of a rectangular shape, as shown here, and may include a cutout interface that mates with the respective interface on the gas turbine fuel injector 900.

Figure 3:
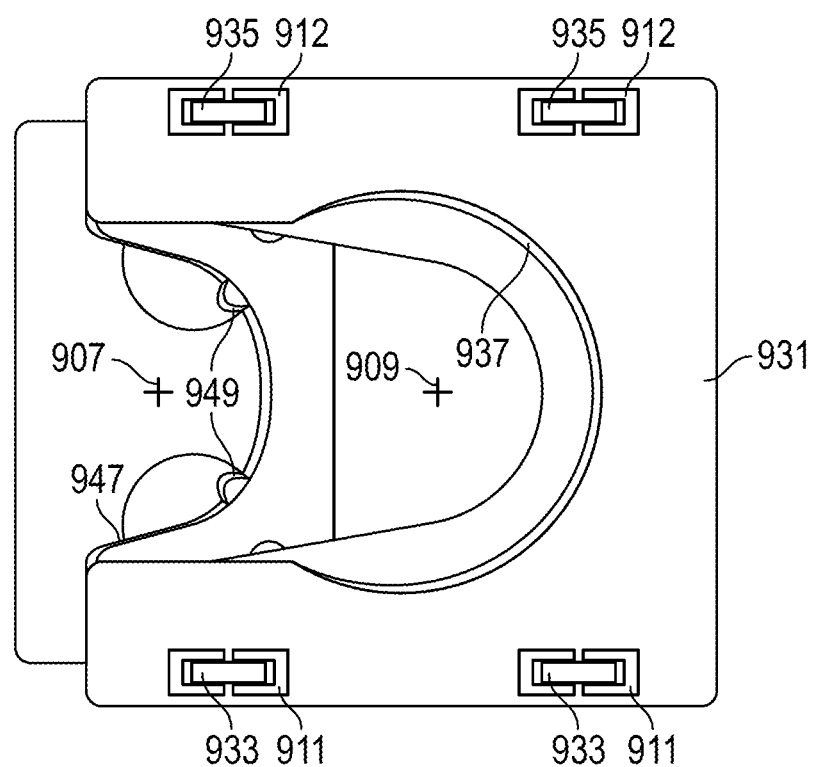
FIG. 3 is a top view of a high temperature brazing fixture without a gas turbine component.

FIG. 3 is a top view of high temperature brazing fixture 910 without the gas turbine fuel injector 900. As shown here, support member 931 may include a neck cutout 937 that allows gas turbine fuel injector 900 (not shown) to extend downward, while still supporting its weight via its mounting bracket 901. Positioning member 941 may also include a cutout 947 configured to receive injector tip 902.

Figure 4:
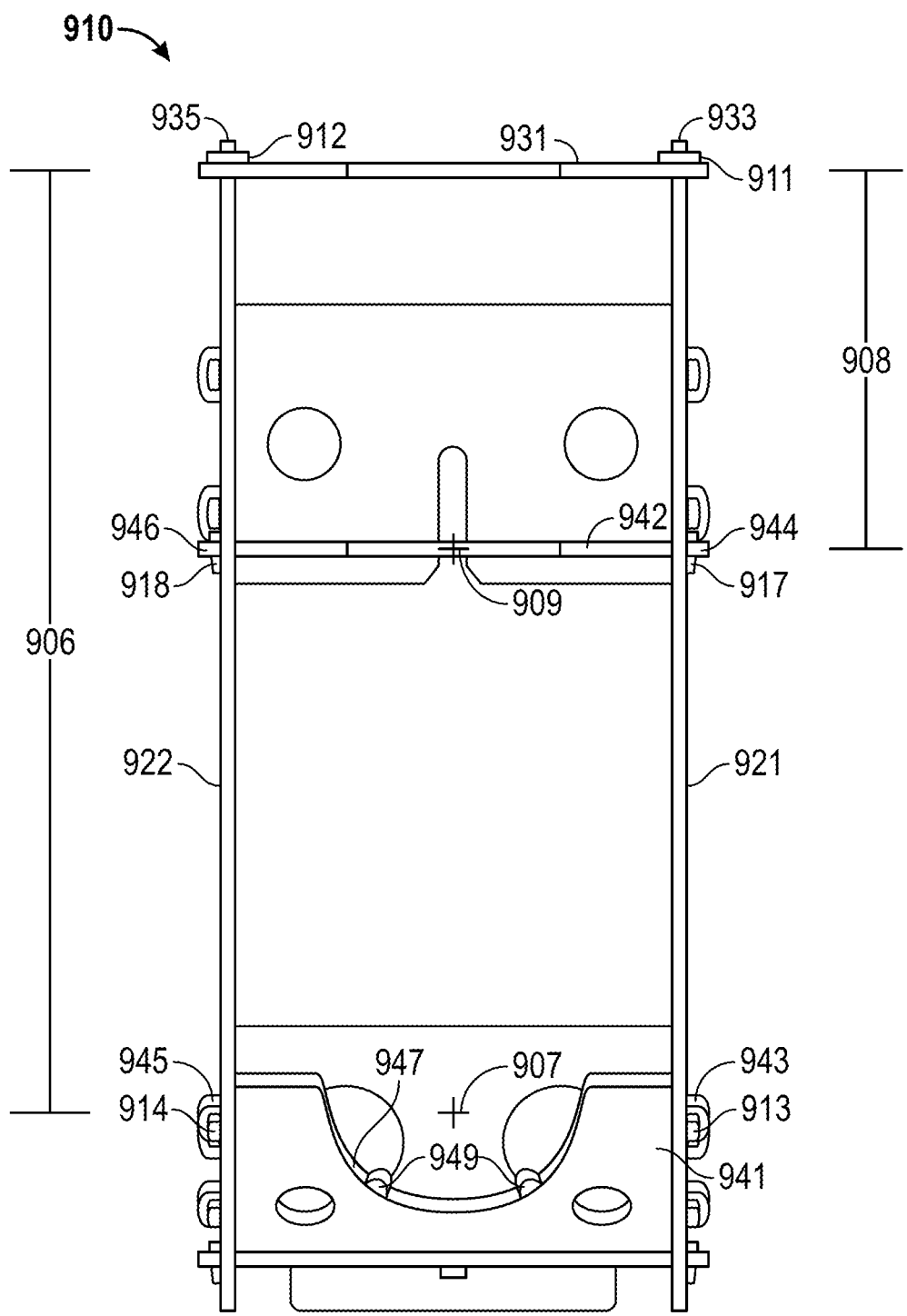
FIG. 4 is a front view of a high temperature brazing fixture without a gas turbine component.

FIG. 4 is a front view of a high temperature brazing fixture without the gas turbine fuel injector 900. As illustrated, cutout 947 of positioning member 941 may also include features such as centering nubs 949 (or other positioning features). Here, the centering nubs 949 may both center the cylinder axis the injector tip 902 at a first location 907 at a first dimension 906 (e.g., referenced off of support member 931), and provide a passage or gap for heat flow between the fixture and component. Also, positioning member 941 is illustrated here as merely centering injector tip 902, but otherwise leaving it unrestrained axially (i.e., along its cylinder axis). However, according to an alternate embodiment, positioning member 941 might include a lip (not shown) or be generally closed-ended with a mating recess (not shown), such that injector tip 902 is both centered and positively held at the first dimension 906.

As illustrated in FIG. 1, both support member 931 and positioning member 941 are mechanically coupled with frame members 921, 922. Notably, this manner of mechanical coupling requires no welding. Instead, the members of the high temperature brazing fixture 910 include tabs which are held together via locking them relative to a mating member. It should be understood that either of the coupled member pairs may include a tab, a tab lock, or both, and the examples given here are merely illustrative. It should also be recognized that the mechanical couplings used here, and throughout high temperature brazing fixture 910, may be readily decoupled, providing for multiple non-destructive reconfigurations of high temperature brazing fixture 910 wherein a different frame member, supporting member, or positioning member is installed.

According to one exemplary embodiment, the support member 931 may be mechanically coupled to the first and second frame members 921, 922, respectively, with at least one tab 933, 935 each and at least a one tab lock 911, 912 each, respectively. As shown, two (or more) tabs 933 and two (or more) tab locks 911 may be used instead of one to mechanically couple with first frame member 921 Likewise, two (or more) tabs 935 and two (or more) tab locks 912 may be used instead of one to mechanically couple with the second frame member 922.

Similarly, positioning member 941 may be mechanically coupled to the first and second frame members 921, 922, respectively, with at least one tab 943, 945 each and at least a one tab lock 913, 914 each, respectively. As shown, two (or more) tabs 943 and two (or more) tab locks 913 may be used instead of one to mechanically couple with first frame member 921 Likewise, two (or more) tabs 945 and two (or more) tab locks 914 may be used instead of one to mechanically couple with the second frame member 922.

Figure 5:
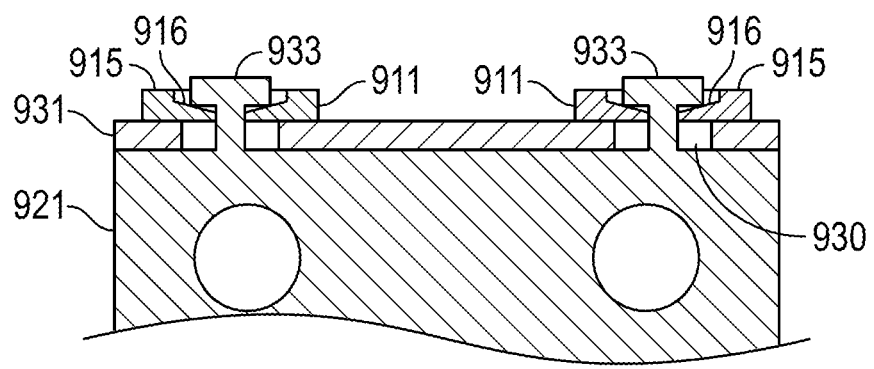
FIG. 5 is a cross sectional view showing one variant of tabs and tab locks used in a high temperature brazing fixture, taken along line 5-5 in FIG. 1.

FIG. 5 is a cross sectional view showing one variant of tabs and tab locks used in a high temperature brazing fixture, taken along line 5-5 in FIG. 1. In particular, first frame member 921 is shown as using a "T"-type tab 933 (also 935) with a "dual horseshoe"-type tab lock 911 (also 912). With this type of coupling, the tabs 933 (also 935) may pass through a T-tab receiving slot 930 cut into the respective mating member, which here happens to be support member 931. Here, the T-tab receiving slot 930 must be sufficiently wide to allow the entire tab 933 (also 935) to pass through the respective mating member. Also, with "dual horseshoe"-type tab lock 911, (also 912), each half lock includes an elevated "horseshoe" shaped section 915 that partially surrounds an angled inner surface 916. When engaged, tab lock 911 may be tapped into position, sliding the angled inner surface 916 underneath the "T" of tab 933, and creating a friction lock via its respective angled inner surface (a wedge surface).

Figure 6:
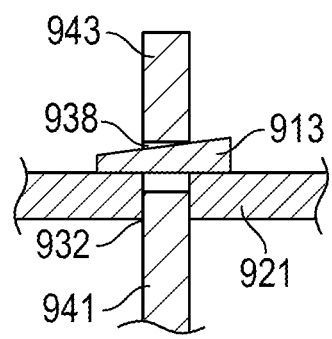
FIG. 6 is a cross sectional view showing another variant of tabs and tab locks used in a high temperature brazing fixture, taken along line 6-6 in FIG. 2.

Similarly, FIG. 6 is a cross sectional view showing another variant of tabs and tab locks used in a high temperature brazing fixture, taken along line 6-6 in FIG. 2. In particular, positioning member 941 is shown as using a "single wedge"-type tab lock 913 (also 914). With this type of coupling, the tabs 943 (also 945) may also pass through a slotted tab receiving slot 932 cut into the respective mating member, which here happens to be first frame member 921. Each "wedge" may then be slid through a tab lock receiving slot 938 cut into the respective tab 943 (also 945), and tapped into position, also creating a friction lock. Here, tab lock 913 (also 914) is shown as "single wedge"-type tab lock, but other friction inserts might be used (e.g., shear pin, press pin, spring pin, etc.). Furthermore, in addition to those couplings shown in high temperature brazing fixture 910, other non-coalesced joints may be used (e.g., hook and slot, slot and groove, dovetail, mortise and tenon, etc.).

Returning to FIG. 1, according to one embodiment, tabs 933, 935, may be integral tabs, i.e., formed as part of first and second frame members 921, 922, respectively, and corresponding receiving slots may be cut into support member 931. Similarly, tabs 943, 945, may be integral to and formed as part of positioning member 941. Accordingly, all four members 921, 922, 931, 941 and their associated tab locks could be efficiently cut from a flat pattern in a single plate/sheet of the superalloy (or a similar material), using, for example, a water jet cutter.

When cut from a flat pattern, each member of the high temperature brazing fixture 910 may be assembled into a "box" shape, wherein the first and second frame members 921, 922 are substantially parallel each other, and substantively perpendicular to either of the support member 931 and the positioning member 941. As illustrated, support member 931 and the positioning member 941 need not be parallel to each other, however.

Returning generally to FIG. 4, complex geometries and/or multiple brazing operations as part of a component build up may require additional supporting, and/or additional positioning structure to be used for one or more stages of a brazing process. Accordingly, the high temperature brazing fixture 910 may further include additional members. In particular, the high temperature brazing fixture 910 may include at least one of a second support member and a second positioning member 942. For example, as shown, second positioning member 942 may be configured to receive and vertically align the cylinder axis of gas turbine fuel injector 900 with a second location 909 and at a second dimension 908 (e.g., referenced off of support member 931). Furthermore, it is contemplated that one or more of the supporting, positioning, and frame members may include features of the other, negating the need for a separate member. For example, as illustrated, in addition to positioning the injector tip 902 of gas turbine fuel injector 900, here, positioning member 941 also supports a portion of its weight.

As above, additional members may be made of similar materials (e.g., the superalloy of the component to be brazed), and mechanically coupled in similar ways (e.g., integral tab and tab lock). For example, second positioning member 942 may also be mechanically coupled to the first and second frame members 921, 922, respectively, with at least one tab 944, 946 each and at least one tab lock 917, 918 each, respectively. As shown in FIG. 2, two (or more) tabs 944 and two (or more) tab locks 917 may be used instead of one to mechanically couple with first frame member 921 Likewise, two (or more) tabs 946 and two (or more) tab locks 918 may be used instead of one to mechanically couple with the second frame member 922.

Figure 7:
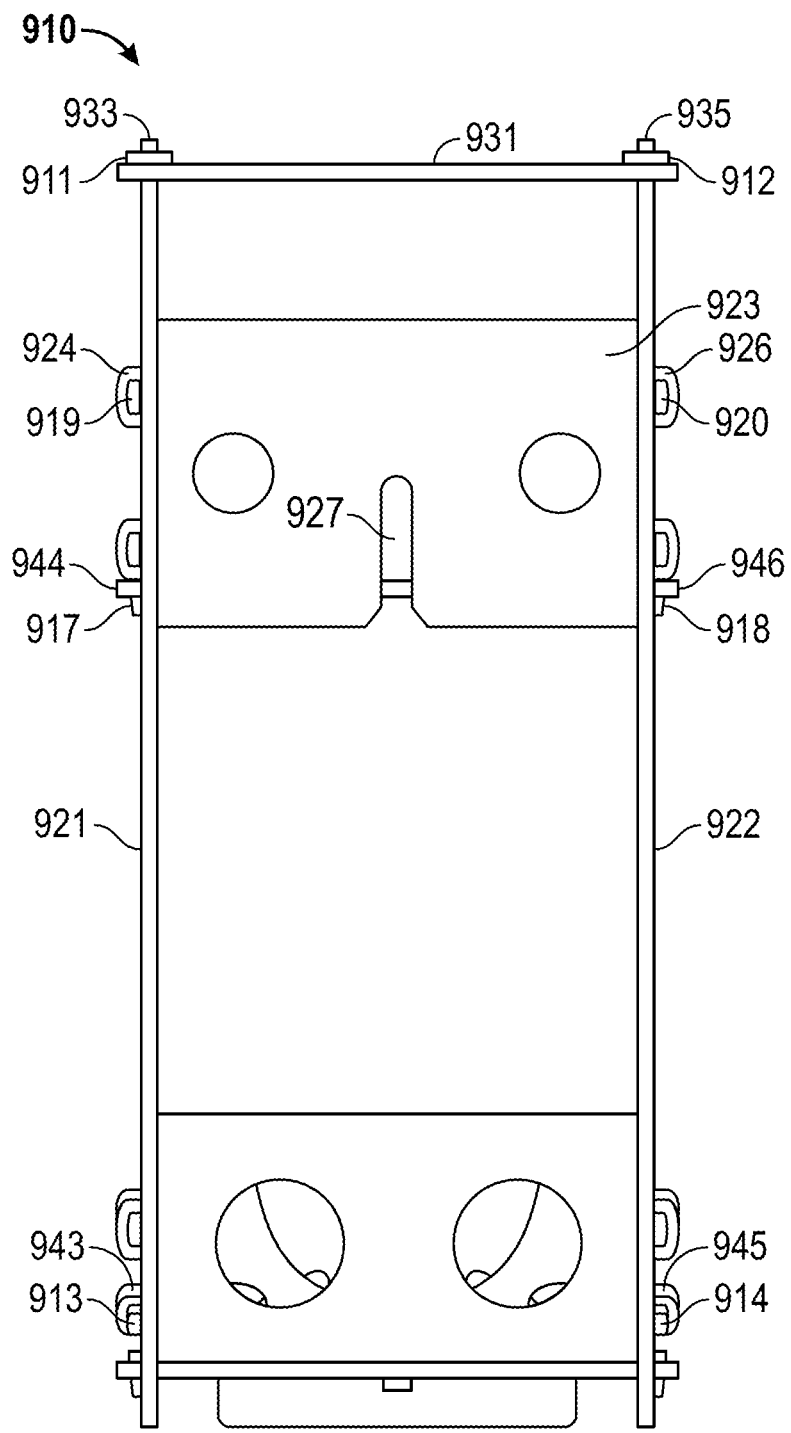
FIG. 7 is a back view of a high temperature brazing fixture without a gas turbine component.

FIG. 7 is a back view of high temperature brazing fixture 910 without gas turbine fuel injector 900. The high temperature brazing fixture 910, may also include one or more additional frame members. In particular, high temperature brazing fixture 910 may include a third frame member 923 made from the superalloy (or other similar material), which may be oriented orthogonal to the first frame member 921 and the second frame member 922. As shown, the third frame member 923 may be mechanically coupled to the first frame member 921 and the second frame member 922 in a similar manner as above (e.g., using an integral tabs 924, 926 and tab locks 919, 920).

In addition to providing greater strength and stability to the overall high temperature brazing fixture 910, the third frame member 923 may also include a lifting hook slot 928 such that a mechanical lifting device (not shown) may be used to transport the high temperature brazing fixture 910 to and from a brazing furnace.

Figure 8:
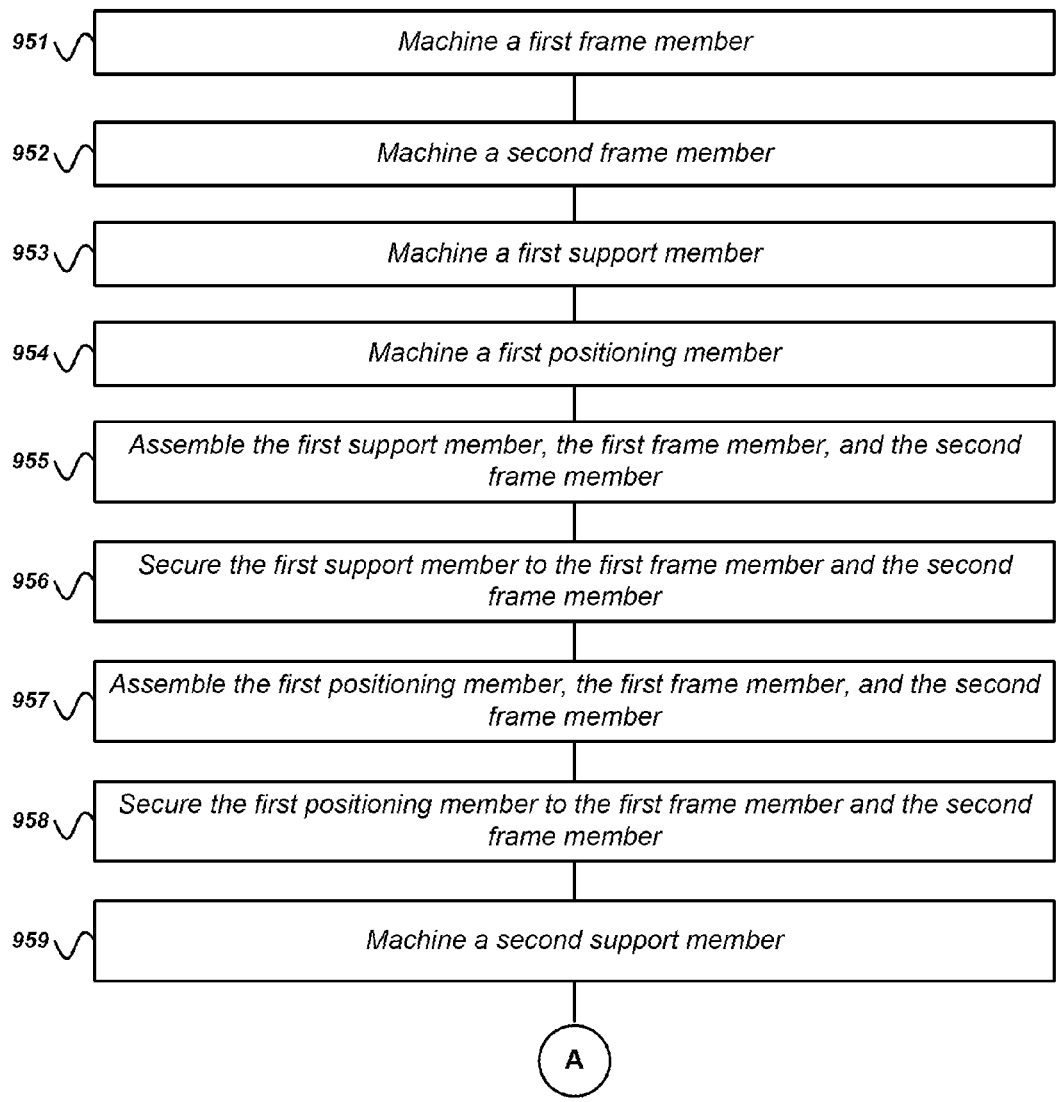
FIG. 8 is a flow chart of the first portion of an exemplary method of manufacturing a fixture for high temperature brazing of a gas turbine engine component.
Figure 9:
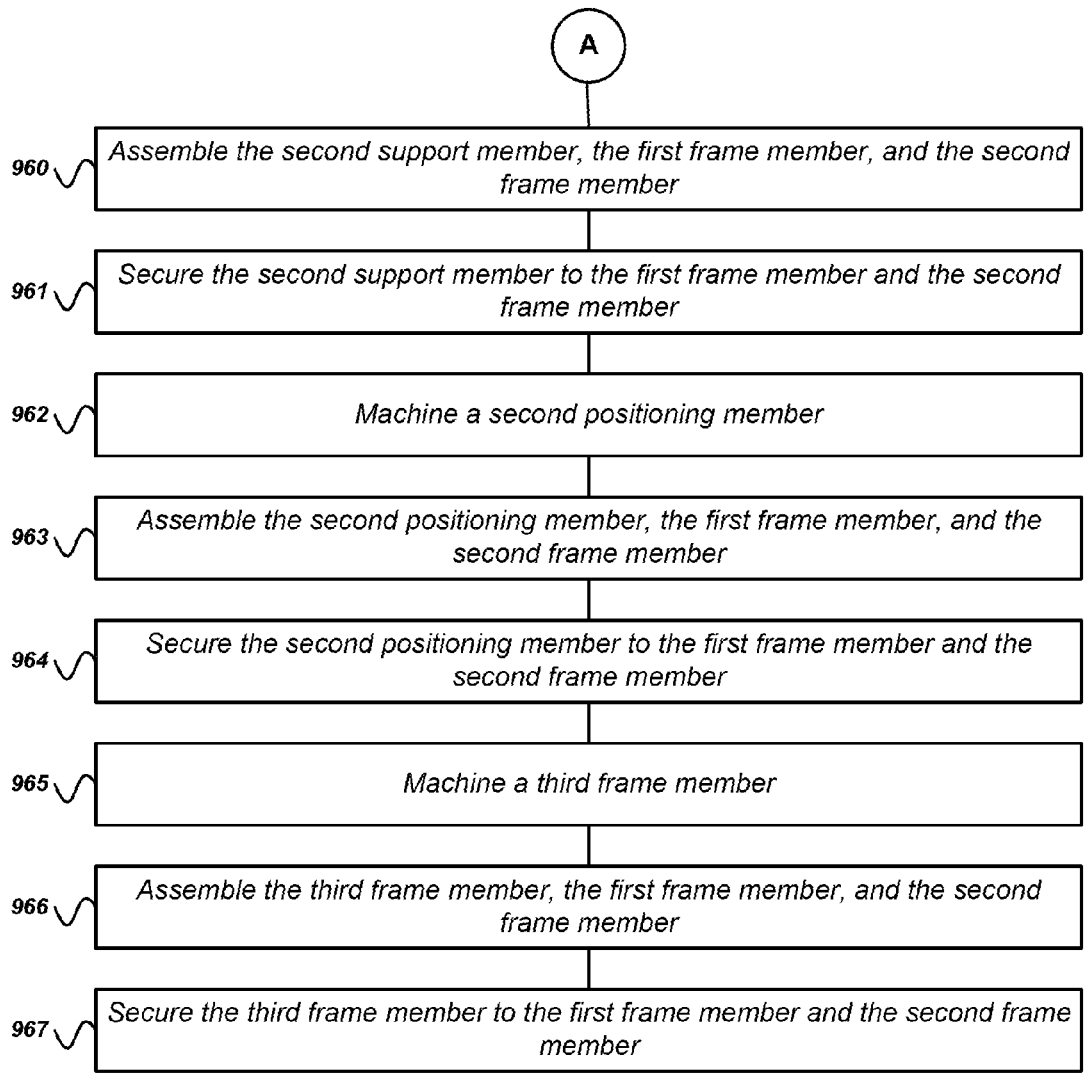
FIG. 9 is a flow chart of the second portion of an exemplary method of manufacturing a fixture for high temperature brazing of a gas turbine engine component

FIG. 8 and FIG. 9 combine as a flow chart of an exemplary method of manufacturing a fixture for high temperature brazing of a gas turbine engine component, according to an exemplary disclosed embodiment. The method may be performed to manufacture the high temperature brazing fixture 910 described above or a similar high temperature brazing fixture.

The method begins with machining a first frame member 951 from a plate material, the plate material being substantially the same as that of the gas turbine engine component or having a sufficiently similar coefficient of thermal expansion. The method also includes machining a second frame member 952, machining a first support member 953, and machining a first positioning member 954, wherein each member is from the same or similar plate material as the first frame member. Each member may be machined to include the same or similar features as the corresponding frame, support, and positioning members described above.

Next, the method may include, assembling the first support member, the first frame member, and the second frame member 955 in a similar manner as described above, and securing the first support member to the first frame member and the second frame member 956 by locking each tab and slot coupling. Likewise, the method may include assembling the first positioning member, the first frame member, and the second frame member 957 in similar manner described above, and securing the first positioning member to the first frame member and the second frame member 958 by locking each of their tab and slot couplings.

According to an alternate embodiment, the method may further include machining a second support member 959 wherein the second support member is from the same or similar plate material as the first frame member but not combined into any previous member, and may be machined to include the same or similar features as the corresponding second support member described above. Next, the method may also include assembling the second support member, the first frame member, and the second frame member 960 in a similar manner as described above, and securing the second support member to the first frame member and the second frame member 961 by locking each tab and slot coupling.

Likewise, the method may include machining a second positioning member 962 wherein the second positioning member is from the same or similar plate material as the first frame member, and may be machined to include the same or similar features as the corresponding second positioning member described above. Next, the method may also include assembling the second positioning member, the first frame member, and the second frame member 963 in a similar manner as described above, and securing the second positioning member to the first frame member and the second frame member 964 by locking each tab and slot coupling.

According to an alternate embodiment, the method may further include machining a third frame member 965 wherein the second support member is from the same or similar plate material as the first frame member, and may be machined to include the same or similar features as the corresponding third frame member described above, for example, including a lifting hook slot. Next, the method may also include assembling the third frame member, the first frame member, and the second frame member 966 in a similar manner as described above, and securing the third frame member to the first frame member and the second frame member 967 by locking each tab and slot coupling.

Industrial Applicability

The present disclosure generally provides a brazing fixture and method of manufacturing a brazing fixture. The brazing fixture is particularly suited for use in repeatedly supporting and positioning metal parts (e.g., gas turbine engine components) having critical tolerances in a challenging high temperature brazing process. High temperature gas turbine components, such as those found in the turbine section, tend to be large, heavy, expensive, and may require close tolerances despite multiple brazing operations (i.e., build stack up). For example, a turbine fuel injector might weigh on the order of sixty pounds, and require a cook in the range of fifteen minutes to two hours in a brazing oven. Normal brazing temperatures might be in the 700 degree Fahrenheit range, or as high as 2100 degrees Fahrenheit.

Components such as those used in gas turbine engines, and the like, are typically subjected to high stresses and high temperatures. This is especially the case with components in the turbine section (e.g., injectors), which may see operating temperatures in the range of 1400-1800 degrees Fahrenheit. Extensive efforts have been made over the years to develop new alloys, such as superalloys, which exhibit excellent mechanical strength and creep resistance at high temperatures, good surface stability, and corrosion and oxidation resistance. Similarly, the braze joints of these superalloys are made at much higher temperatures than those of other close-fitting joints that operate in much less hostile environments. In addition to being made of exotic materials, gas turbine components are typically precision parts, frequently including complex geometries, and often requiring close tolerance of certain envelope dimensions/positions after brazing is complete.

Also, for high volume manufacturers, brazing fixtures could be required in brazing operations involving tens of different models of one particular gas turbine engine part. Depending on the differences between models, different brazing positioning interfaces may be needed to maintain any number of critical features of the gas turbine engine component (e.g., component interface locations or dimensions, airflow stream lines, injector inlet alignment angle, injector tip placement, etc.) within a predetermined design tolerance (e.g., 0.010"). The high temperature brazing fixture disclosed herein is manufactured to address these and other challenges.

The disclosed high temperature brazing fixture and method of manufacture is generally applicable to any high temperature brazing process, and is particularly applicable to the use, operation, maintenance, repair, and improvement of gas turbine engines. Specifically, the high temperature brazing fixture may be suited for the design, manufacture, test, repair, overhaul, and improvement of gas turbine engine components. Gas turbine engines, and thus the components thereof, may be suited for any number of industrial applications, such as, but not limited to, various aspects of the oil and natural gas industry (including include transmission, gathering, storage, withdrawal, and lifting of oil and natural gas), power generation industry, aerospace and transportation industry, to name a few examples.

While these types of mechanical couplings are unconventional for metal work in general, and a high temperature brazing fixture in particular, the inventor has found that using these woodworking/furniture-type joints mitigates problems encountered over time using conventional metal joining techniques (e.g., welding, bolting, etc.). For example, over time, residual stresses in the welds may be released during repeated brazing operations, taking the fixture out of alignment. Also, standard metal fasteners tend to degrade at these higher brazing temperatures. Accordingly, as discussed above, rework of costly superalloy brazing fixtures here may be both quick and cost effective, as their members are modular and readily detachable.

In order to improve efficiency, decrease maintenance, and lower costs, embodiments of the presently disclosed high temperature brazing fixture and method of manufacture may be used on gas turbine components at any stage of the gas turbine component's life, from first manufacture and prototyping to end of life. In addition, the fixture and method of manufacture may be used in response to an event, as a preventative measure, or as an enhancement to an existing gas turbine engine component.

Although this invention has been shown and described with respect to a detailed embodiment thereof, it will be understood by those skilled in the art that various changes in form and detail thereof may be made without departing from the spirit and scope of the claimed invention. Accordingly, The preceding detailed description is merely exemplary in nature and is not intended to limit the invention or the application and uses of the invention. The described embodiments are not limited to use in conjunction with a particular type of gas turbine engine, or a gas turbine engine (or component) at all. Hence, although the present embodiments are, for convenience of explanation, depicted and described as being implemented in the brazing of a gas turbine engine fuel injector, it will be appreciated that it can be implemented in various other types of components, turbines, and in various other systems and environments. Furthermore, there is no intention to be bound by any theory presented in any preceding section. It is also understood that the illustrations may include exaggerated dimensions and graphical representation to better illustrate the referenced items shown, and are not consider limiting unless expressly stated as such.

What is claimed is:

1. A high temperature brazing fixture for a component made of a superalloy, the high temperature brazing fixture comprising:

a first frame member made of a superalloy;

a second frame member made of the superalloy;

a first support member made of the superalloy and configured to interface with and support at least a first portion of the component, the first support member mechanically coupled to the first frame member and to the second frame member;

a first tab that extends from one of the first support member and the first frame member and passes through a first corresponding slot in the other of the first support member and the first frame member, the first tab including a first tab lock receiving slot extending therethrough, the first tab lock receiving slot defining a through hole in the first tab;

a first tab lock extending into the first tab lock receiving slot;

a second tab that extends from one of the first support member and the second frame member and passes through a second corresponding slot in the other of the first support member and the second frame member, the second tab including a second tab lock receiving slot extending therethrough, the second tab lock receiving slot defining a through hole in the second tab;

a second tab lock extending into the second tab lock receiving slot;

a first positioning member made of the superalloy and configured to interface with and position at least a first location of or hold a first dimension of the component, the first positioning member mechanically coupled to the first frame member and to the second frame member;
a third tab that extends from one of the first positioning member and the first frame member and passes through a third corresponding slot in the other of the first positioning member and the first frame member, the third tab including a third tab lock receiving slot extending therethrough, the third tab lock receiving slot defining a through hole in the third tab;
a third tab lock extending into the third tab lock receiving slot;
a fourth tab that extends from one of the first positioning member and the second frame member and passes through a fourth corresponding slot in the other of the first positioning member and the second frame member, the fourth tab including a fourth tab lock receiving slot extending therethrough, the fourth tab lock receiving slot defining a through hole in the fourth tab; and
a fourth tab lock extending into the fourth tab lock receiving slot.

2. The high temperature brazing fixture of claim 1, wherein the first frame member is substantially parallel to the second frame member; and
wherein at least one of the first support member and the first positioning member are substantively perpendicular to both the first frame member and the second frame member.

3. The high temperature brazing fixture of claim 1, wherein the first positioning member is further configured to support at least a second portion of the component.

4. The high temperature brazing fixture of claim 1, wherein the first tab lock is wedged between the first tab and the other of the first support member and the first frame member;
wherein the second tab lock is wedged between the second tab and the other of the first support member and the second frame member;
wherein the third tab lock is wedged between the third tab and the other of the first positioning member and the first frame member; and
wherein the fourth tab lock is wedged between the fourth tab and the other of the first positioning member and the second frame member.

5. The high temperature brazing fixture of claim 1, wherein the first frame member, the second frame member, the first support member, and the first positioning member are each made from a flat piece of the superalloy, respectively, wherein each flat piece of the superalloy has the same thickness.

6. The high temperature brazing fixture of claim 1, wherein the first frame member and the second frame member each include at least one flow hole.

7. The high temperature brazing fixture of claim 1, further comprising:
a second positioning member made of the superalloy and configured to interface with and position at least a second location of or hold a second dimension of the component, the second positioning member mechanically coupled to the first frame member and to the second frame member;
a fifth tab that extends from one of the second positioning member and the first frame member and passes through a fifth corresponding slot in the other of the second positioning member and the first frame member, the fifth tab including a fifth tab lock receiving slot extending therethrough;
a fifth tab lock extending into the fifth tab lock receiving slot;
a sixth tab that extends from one of the second positioning member and the second frame member and passes through a sixth corresponding slot in the other of the second positioning member and the second frame member, the sixth tab including a sixth tab lock receiving slot extending therethrough; and
a sixth tab lock extending into the sixth tab lock receiving slot.

8. The high temperature brazing fixture of claim 7, wherein the second positioning member is further configured to support at least a third portion of the component.

9. The high temperature brazing fixture of claim 1, further comprising a third frame member made of the superalloy, and oriented orthogonal to the first frame member and the second frame member; and
wherein the third frame member is mechanically coupled to the first frame member with at least a seventh tab and at least a seventh tab lock, the seventh tab extending from one of the third frame member and the first frame member and passing through a seventh corresponding slot in the other of the third frame member and the first frame member, the third frame member also mechanically coupled to the second frame member with at least an eighth tab and at least a eighth tab lock, the eighth tab extending from one of the third frame member and the second frame member and passing through an eighth corresponding slot in the other of the third frame member and the second frame member.

10. The high temperature brazing fixture of claim 9, wherein the third frame member includes a lifting hook slot.

11. The high temperature brazing fixture of claim 1, wherein at least one of the first tab lock, second tab lock, third tab lock, and fourth tab lock is a wedge.

12. The high temperature brazing fixture of claim 1, wherein at least one of the first tab lock, second tab lock, third tab lock, and fourth tab lock include a sloped top portion.

13. The high temperature brazing fixture of claim 1, wherein at least one of the first tab lock, second tab lock, third tab lock, and fourth tab lock is a shear pin, press pin, or spring pin.

14. A high temperature brazing fixture for a component made of a superalloy, the high temperature brazing fixture comprising:
a first frame member made of a superalloy;
a second frame member made of the superalloy;
a first support member made of the superalloy and configured to interface with and support at least a first portion of the component, the first support member removably attached to the first frame member and to the second frame member;
a first tab that extends from one of the first support member and the first frame member, and passes through a first corresponding slot in the other of the first support member and the first frame member;
a first pin abutting at least a portion of the first tab;
a second tab that extends from one of the first support member and the second frame member and passes through a second corresponding slot in the other of the first support member and the second frame member;
a second pin abutting at least a portion of the second tab;
a first positioning member made of the superalloy and configured to interface with and position at least a first location of or, hold a first dimension of the component, the first positioning member removably attached to the first frame member and to the second frame member;
a third tab that extends from one of the first positioning member and the first frame member and passes through a third corresponding slot in the other of the first positioning member and the first frame member;
a third pin abutting at least a portion of the third tab;
a fourth tab that extends from one of the first positioning member and the second frame member and passes through a fourth corresponding slot in the other of the first positioning member and the second frame member;
a fourth pin abutting at least a portion of the fourth tab;
wherein at least one of the first tab, the second tab, the third tab, and the fourth tab include a pin receiving slot extending therethrough, the pin receiving slot defining a through hole in the at least one of the first tab, the second tab, the third tab and the fourth tab; and
wherein at least one of the first pin, the second pin, the third pin, and the fourth pin extends through its respective pin receiving slot.

15. The high temperature brazing fixture of claim 14, wherein the first pin is wedged between the first tab and the other of the first support member and the first frame member;
wherein the second pin is wedged between the second tab and the other of the first support member and the second frame member;
wherein the third pin is wedged between the third tab and the other of the first positioning member and the first frame member; and
wherein the fourth pin is wedged between the fourth tab and the other of the first positioning member and the second frame member.

16. The high temperature brazing fixture of claim 14, wherein the first frame member, the second frame member, the first support member, and the first positioning member are each made from a flat piece of the superalloy, respectively, wherein each flat piece of the superalloy has the same thickness.

17. The high temperature brazing fixture of claim 14, wherein the first frame member is substantially parallel to the second frame member; and
wherein at least one of the first support member and the first positioning member are substantively perpendicular to both the first frame member and the second frame member.

18. The high temperature brazing fixture of claim 14, wherein the first positioning member is further configured to support at least a second portion of the component.

19. The high temperature brazing fixture of claim 14, further comprising a third frame member made of the superalloy, and oriented orthogonal to the first frame member and the second frame member; and
wherein the third frame member is removably attached to the first frame member with at least a seventh tab and at least a seventh pin, the seventh tab extending from one of the third frame member and the first frame member and passing through a seventh corresponding slot in the other of the third frame member and the first frame member, the third frame member also removably attached to the second frame member with at least an eighth tab and at least a eighth pin, the eighth tab extending from one of the third frame member and the second frame member and passing through an eighth corresponding slot in the other of the third frame member and the second frame member.

20. The high temperature brazing fixture of claim 19, wherein the third frame member includes a lifting hook slot.

* * * * *